Feb. 19, 1952    J. K. DAVIS    2,586,418
TWO ELEMENT PHOTOGRAPHIC LENS SYSTEM
Filed Sept. 29, 1950

| EFL = 68.6 mm | | BF = 53.44 | |
|---|---|---|---|
| LENS | $N_D$ | RADII | THICKNESS |
| 17 | 1.523 | $R_1 = +23.22$ | $t_1 = 2.78$ |
|  |  | $R_2 = +35.19$ | $S_1 = 11.15$ |
| 25 | 1.523 | $R_3 = -35.19$ | $S_2 = 11.15$ |
|  |  | $R_4 = -23.22$ | $t_2 = 2.78$ |

INVENTOR
JOHN K. DAVIS
BY
Louis L. Gagnon
ATTORNEY

Patented Feb. 19, 1952

2,586,418

UNITED STATES PATENT OFFICE 2,586,418

TWO ELEMENT PHOTOGRAPHIC LENS SYSTEM

John K. Davis, East Woodstock, Conn., assignor to American Optical Company, Southbridge, Mass., a voluntary association of Massachusetts Application September 29, 1950, Serial No. 187,513

5 Claims. (Cl. 88—57)

This invention relates to camera lenses and has particular reference to an improved two-element objective for photographic purposes.

One of the principal objects of this invention is to provide an improved, efficient and inexpensive two-element lens system corrected for field errors for use in cameras.

Another object is to provide an improved two-element objective for photographic purposes, the elements of which are identical meniscus lenses so shaped and spaced with respect to one another and with a stop therebetween as to produce a relatively wide field angle with a relatively short back focus.

Another object is to provide improved optical systems of the above character which are adapted for use in cameras of predetermined standardized sizes and shapes.

Figure 1:
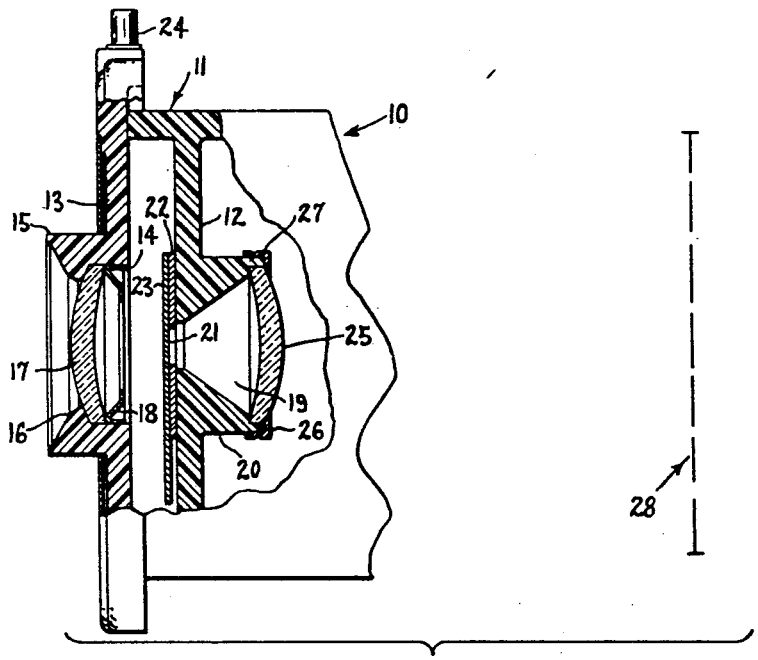
Figure 2:
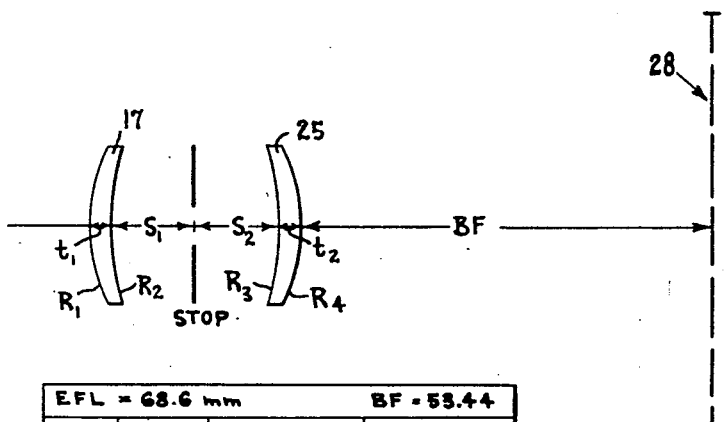

Other objects and advantages will become apparent from the following description taken in connection with the accompanying drawing, in which Fig. 1 is a fragmentary side elevational view of a camera showing a section through the lens system and lens supporting structure thereof;

Fig. 2 is a diagrammatic illustration of the optical system embodying the invention.

In manufacturing photographic equipment it is often desirous to produce a camera embodying a simple and relatively inexpensive lens system which will permit exposure of a relatively large area of film with a camera of comparatively small size. Such a lens system, therefore, must be so computed with respect to a stop that a relatively wide field angle is produced with a relatively short back focus. It is also desirable that such a system also be corrected for field errors.

It is known that to be efficient, a two component objective for cameras must be provided with surface curvatures having relatively short radii. However, such surface curvatures are relatively expensive to produce. Therefore, lenses are desirable which are made as flat as possible but which are efficient in cooperatively producing a clear image at the image plane.

A lens system in accordance with the present invention accomplishes the above through the provision of a pair of identical meniscus lenses having their surfaces so shaped and their special relation with a stop so controlled as to produce the desired results.

Referring to the drawing, wherein for the purpose of illustration is shown a preferred embodiment of my invention, numeral 10 designates a portion of a camera housing having the usual lens barrel 11. The lens barrel 11 is constructed in two major parts, an inner part 12 and an outer part 13, which parts are suitably attached by means not shown. The outer part 13 is formed with a central opening 14 encircled by a forwardly extending annular portion 15 having an inner annular shoulder 16 therein against the rear side of which is positioned the convex surface of a meniscus shaped lens 17. The lens 17 is retained in position in the opening by means such as an annular spring clip 18.

The inner part 12 of the barrel 11 is formed with a central opening 19 substantially axially aligned with the opening 14 in part 13, the opening 19 being encircled by a thickened enlarged portion 20 of the part 12 and being frusto-conical in shape with its end of large diameter directed rearwardly and its end of small diameter being of predetermined size whereby it will not obscure an aperture 21 formed in a stop 22 slidably mounted upon the front surface of the part 12 of the barrel. The aperture 21 is of predetermined size, preferably not larger than a diameter of 5.33 millimeters but may be made smaller if desired. It is substantially axially aligned with the openings 14 and 19. The 5.33 aperture will introduce a speed of approximately f/11. A shutter 23 is slidably mounted over the stop 22 so as to uncover the aperture 21 in operating the device. The operation of the stop 22 and shutter 23 are controlled by a push button 24 through conventional mechanism not shown so that light may pass through lens 17, shutter 23 and aperture 21 onto and through a second meniscus shaped lens 25 which is positioned over the opening 19 with its peripheral edge in an annular groove 26 formed in the rear edge of the enlarged annular portion 20 of the part 12. The lens 25 is positioned with its concave surface directed toward the stop 22 and is held in position by means such as a ring-like clip 27.

A further description of the camera is not believed necessary other than to state that the film to be exposed is suitably carried on spools or plates in a conventional manner with the sensitized surface thereof directed toward the lens system and located at a predetermined distance therefrom, as will be described hereinafter. The film is diagrammatically illustrated as an image plane 28 in Fig. 1 of the accompanying drawing.

Referring more particularly to the lens system, according to one manner of describing the invention, the front and rear surfaces of the respective components 17 and 25 have radii of curvature which are numerically set forth in the following table wherein the four surfaces are numbered by subscripts in order from the front to the rear of the objective:

| Lens | $N_D$ | Radii | Thicknesses |
|---|---|---|---|
| 17 | 1.523 | $R_1=+23.22$<br>$R_2=+35.19$ | $t_1=2.78$ mm.<br>$s_1=11.15$. |
| 25 | 1.523 | $R_3=-35.19$<br>$R_4=-23.22$ | $s_2=11.15$.<br>$t_2=2.78$. |

In the table the data, as given, corresponds to a focal length of 68.6 mm. Each component 17 and 25 consists of a simple lens element which, it will be noted, are identical meniscus shaped lenses having their concave surfaces directed toward one another. The second column gives the refractive index N for the D line of the spectrum. The third and fourth columns give the radii of curvatures R, thicknesses $t$, and spaces $s$, each numbered by subscripts in order from front to rear. The + and − signs indicate surfaces respectively convex and concave to the front, and BF is the back focal length corrected for spherical aberration.

The dioptric powers of the surfaces for a wavelength of 432 mu. are approximately as folows:

$$R_1 = 23D$$
$$R_2 = 15.2D$$
$$R_3 = 15.2D$$
$$R_4 = 23D$$

The presently described lens system was designed primarily to operate most efficiently at a focal distance of approximately 6.4 meters from the object. It is to be understood that the dimensions given are all approximate since tolerances are allowable in formation of the lens surfaces, spacing of the components, etc.

Since the presently described lens system was also designed primarily for use in a camera wherein the shoulders 16 of the outer part of the lens barrel 11 and the groove 26 of the inner part 12 thereof are spaced apart at standardized distances when the parts 11 and 12 are assembled, and are formed to definite diametrical dimension, the lenses 17 and 25 are further preferably formed to a diameter of approximately 20.5 mm., so that they may be used with such a camera and, in being used, will be positioned in definite spaced relation in accordance with the foregoing figures.

The above lens system results in a relatively wide field angle with a relatively short back focal distance in accordance with the objects set forth hereinbefore.

It will be apparent that many changes may be made in the details of construction and arrangement of parts shown and described without departing from the spirit of the invention as expressed in the accompanying claims. Therefore, it is to be understood that all matter set forth or shown in the accompanying drawing is to be interpreted as illustrative and not in a limiting sense.

I claim:

1. A photographic objective comprising two substantially identical meniscus components axially aligned with one another with a member having a restricted opening therebetween and concave toward the center of the objective, said components having refractive indices of approximately 1.523, said objective being computed for a back focal length of approximately 53.44 mm. and conforming substantially to the specifications in the following table:

| Lens | Radii | Thicknesses |
|---|---|---|
| I | $R_1=23.22$ mm.<br>$R_2=35.19$ | $t_1=2.78$ mm.<br>$s_1=11.15$. |
| II | $R_3=35.19$<br>$R_4=23.22$ | $s_2=11.15$.<br>$t_2=2.78$. | wherein the components are numbered by Roman numerals in order from front to rear, and the radii of curvature R, the thicknesses $t$ and the spaces $s$ are specified in the second and third columns, each being numbered in order from front to rear.

2. In an optical system for cameras wherein light is focused by means of an objective upon an image plane located a predetermined distance therefrom, said objective comprising a lens system of two components and a member having a restricted opening located between said components, one of said components having a meniscus shape and being disposed with its concave surface directed toward the center of said objective, and the other of said components being meniscus shaped and axially aligned with said first component and said image plane and further being disposed with its concave surface directed toward said first component, said components both having an index of refraction of approximately 1.523 and being spaced apart on their axes at a distance of 11.15 mm. from said member, the concave surface curvatures of said components having radii of approximately 35.19 mm. and the opposed convex surface curvatures thereof having radii of approximately 23.22 mm.

3. In an optical system for cameras wherein light is focused by means of an objective upon an image plane located at a distance of approximately 53.44 mm. therefrom, said objective comprising spaced lenses having a member provided with a restricted opening located therebetween, said lenses comprising a first component having a meniscus shape disposed with its concave surface directed toward the center of said objective, and a second meniscus shaped component axially aligned with said first component and said image plane and disposed with its concave surface directed toward said first component, said components both having an index of refraction of approximately 1.523 and being spaced apart on their axes at a distance of approximately 11.15 mm. from said member, said components each further having their concave surface curvatures formed to a radius of approximately 35.19 mm. and their opposed convex surface curvatures formed to a radius of approximately 23.22 mm.

4. In an optical system for cameras wherein light is focused by means of an objective upon an image plane located at a distance of approximately 53.44 mm. therefrom, said objective embodying a member having a restricted opening located substantially centrally thereof, lenses for said objective comprising a first component having a meniscus shape disposed with its concave surface directed toward the center of said objective, and a second meniscus shaped component axially aligned with said first component and said image plane and disposed with its concave surface directed toward said first component, said components both having an index of refraction of approximately 1.523 and being spaced apart on their axes at a distance of approximately 11.15 mm. from said member, said components each further having concave surface curvatures of approximately 35.19 mm. radius and opposed convex surface curvatures of approximately 23.22 mm. radius, said components each still further being approximately 20.5 mm. in diameter.

5. In an optical system for cameras wherein light is focused by means of an objective upon an image plane located at a distance of approximately 53.44 mm. therefrom, said objective embodying a member having a restricted opening of a diameter of about 5.33 mm. located substantially centrally thereof, lenses for said objective comprising a first component having a meniscus shape disposed with its concave surface directed toward the center of said objective, and a second meniscus shaped component axially aligned with said first component and said image plane and disposed with its concave surface directed toward said first component, said components both having an index of refraction of approximately 1.523 and being spaced apart on their axes at a distance of approximately 11.15 mm. from said member, said components each further having concave surface curvatures for a wave length of 432 mu. of approximately 15.2 diopters, and opposed convex surface curvatures for a wave length of 432 mu. of approximately 23 diopters.

JOHN K. DAVIS.

REFERENCES CITED

The following references are of record in the file of this patent:

UNITED STATES PATENTS

| Number | Name | Date |
| --- | --- | --- |
| 35,605 | Harrison et al. | June 17, 1862 |
| 42,880 | Schnitzer | May 24, 1864 |
| 706,650 | Goerz | Aug. 12, 1902 |
| 2,346,062 | Altman | Apr. 4, 1944 |

FOREIGN PATENTS

| Number | Country | Date |
| --- | --- | --- |
| 454,347 | Germany | Jan. 6, 1928 |